United States Patent [19]

Sato et al.

[11] Patent Number: 4,772,970
[45] Date of Patent: Sep. 20, 1988

[54] TAPE CASSETTE LOADING AND UNLOADING APPARATUS HAVING A LOCK MECHANISM FOR LOCKING A TAPE CASSETTE IN A LOADING POSITION

[75] Inventors: Manabu Sato, Yokohama; Masaki Ikekawa, Kawasaki, both of Japan

[73] Assignee: Victor Company of Japan, Ltd., Kanagawa, Japan

[21] Appl. No.: 906,755

[22] Filed: Sep. 12, 1986

Related U.S. Application Data

[63] Continuation-in-part of Ser. No. 823,381, Jan. 28, 1986.

[30] Foreign Application Priority Data

Jan. 29, 1985 [JP] Japan .................................. 60-10704
Sep. 13, 1985 [JP] Japan .......................... 60-141318[U]

[51] Int. Cl.$^4$ .......................................... G11B 15/675
[52] U.S. Cl. .................................................... 360/96.5
[58] Field of Search ................................ 360/96.5, 84

[56] References Cited

U.S. PATENT DOCUMENTS

| 4,150,410 | 4/1979 | Tsumura | 360/96.5 |
| 4,638,386 | 1/1987 | Takamatsu | 360/96.5 |
| 4,641,210 | 2/1987 | Ohyama | 360/96.5 |

Primary Examiner—Robert S. Tupper
Attorney, Agent, or Firm—Michael N. Meller

[57] ABSTRACT

A tape cassette loading and unloading apparatus has a holder which is inserted with a tape cassette, a holder guide for guiding the holder between a cassette receiving position and a predetermined loading position via an insertion completion position a holder mover for moving the holder, a force transmitter coupled to a motor for driving the holder mover, and a pushing member for pushing a top surface of the tape cassette. The force transmitter has first and second rotary members such that the first rotary member locks the second rotary member when the holder reaches the predetermined loading position.

9 Claims, 12 Drawing Sheets

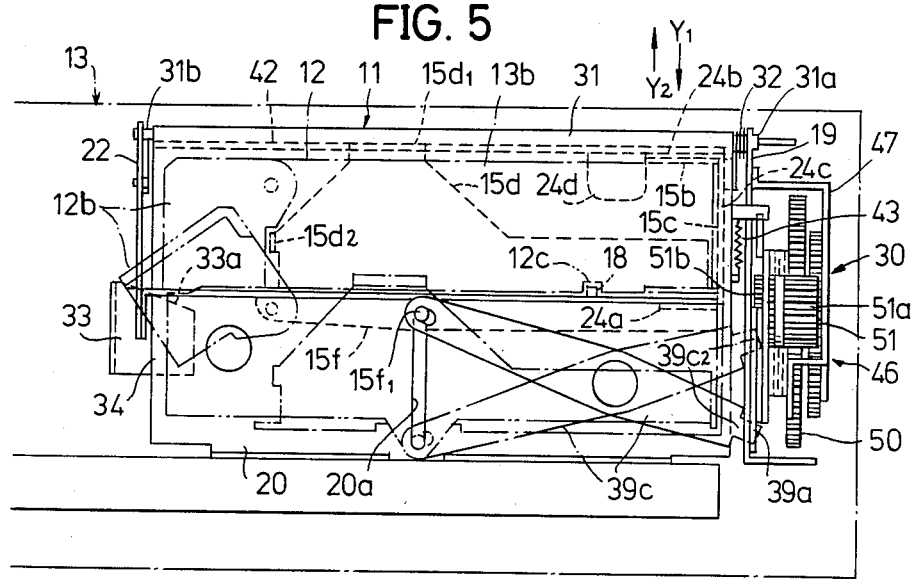
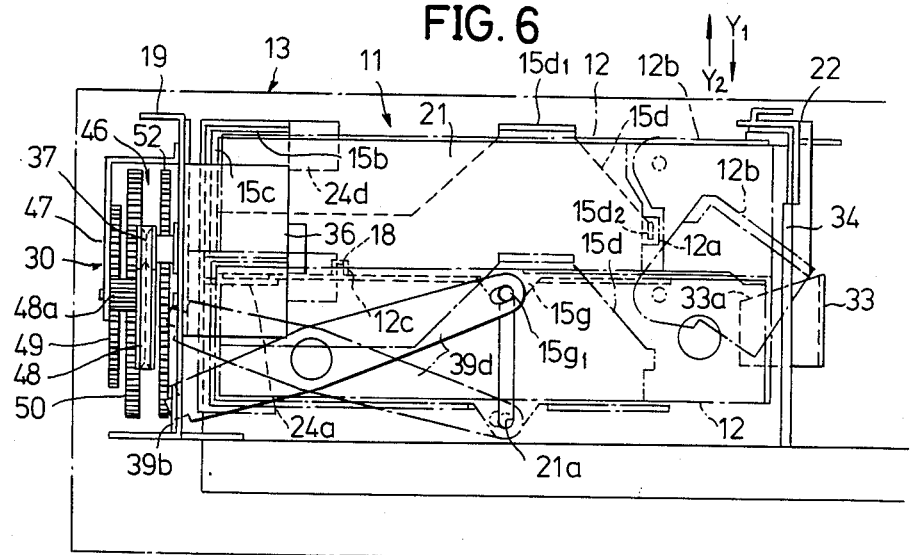

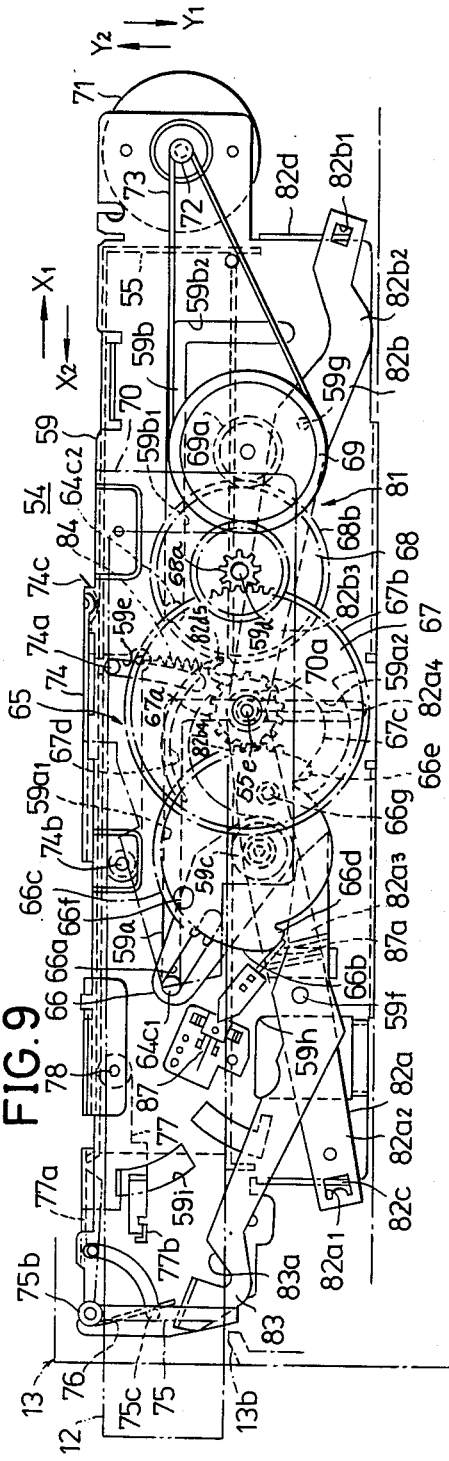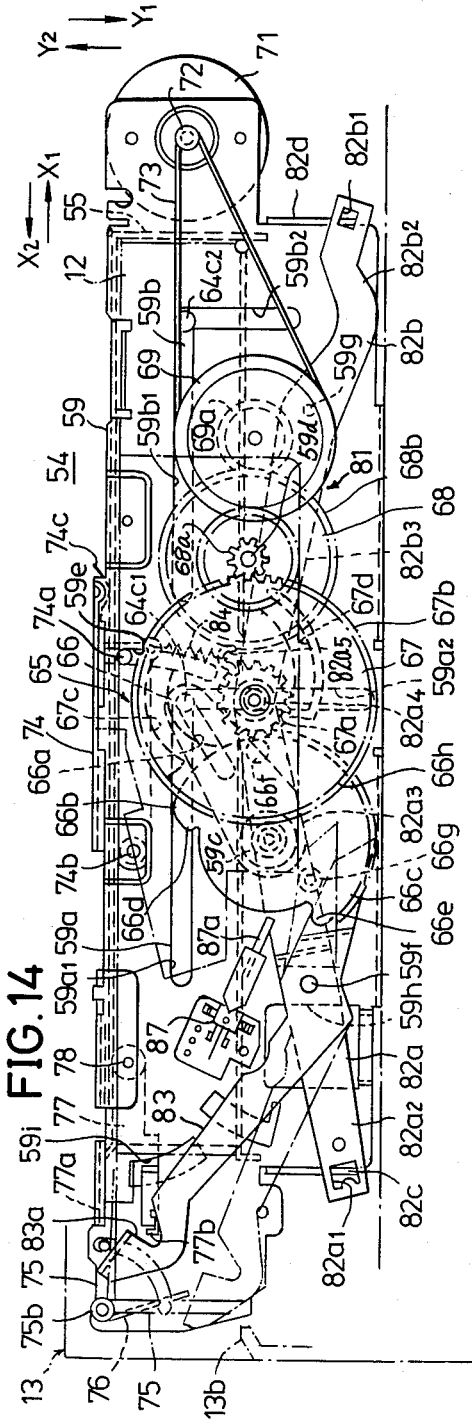

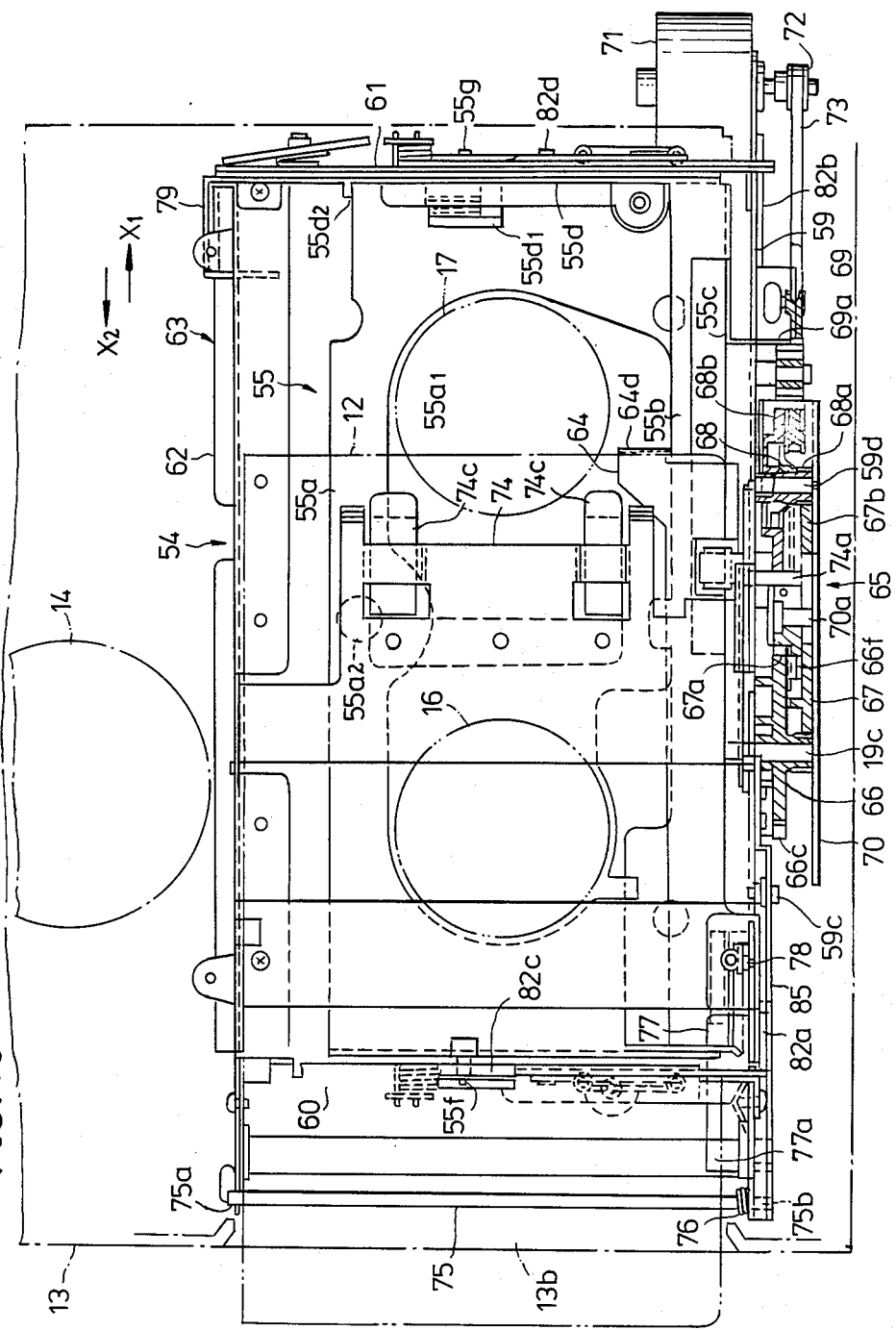

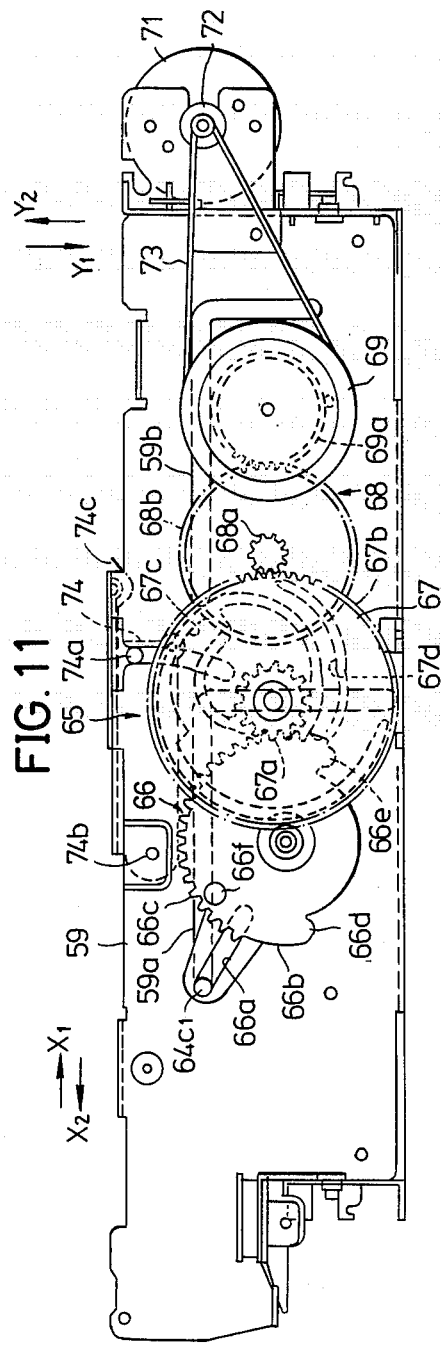
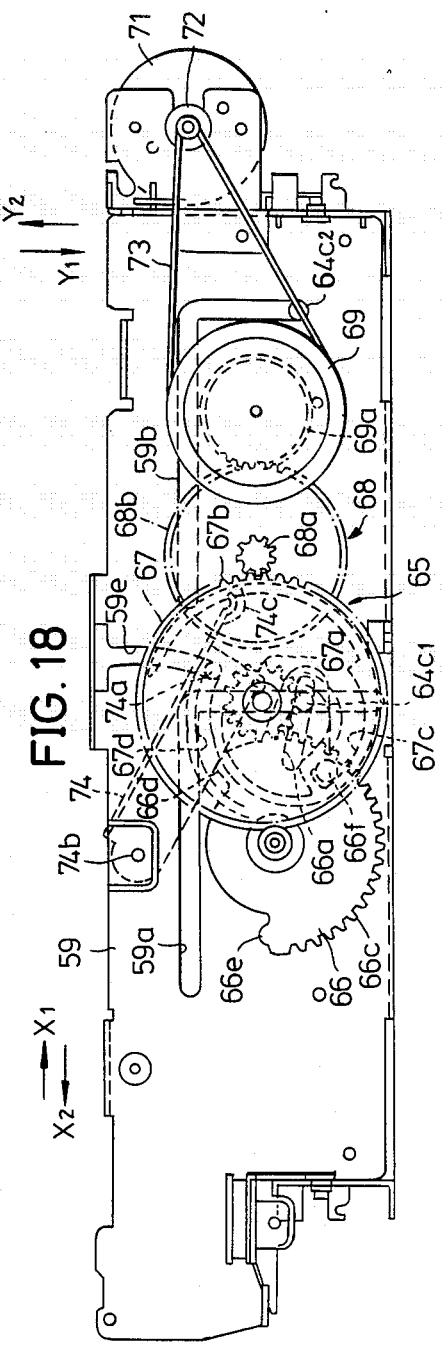

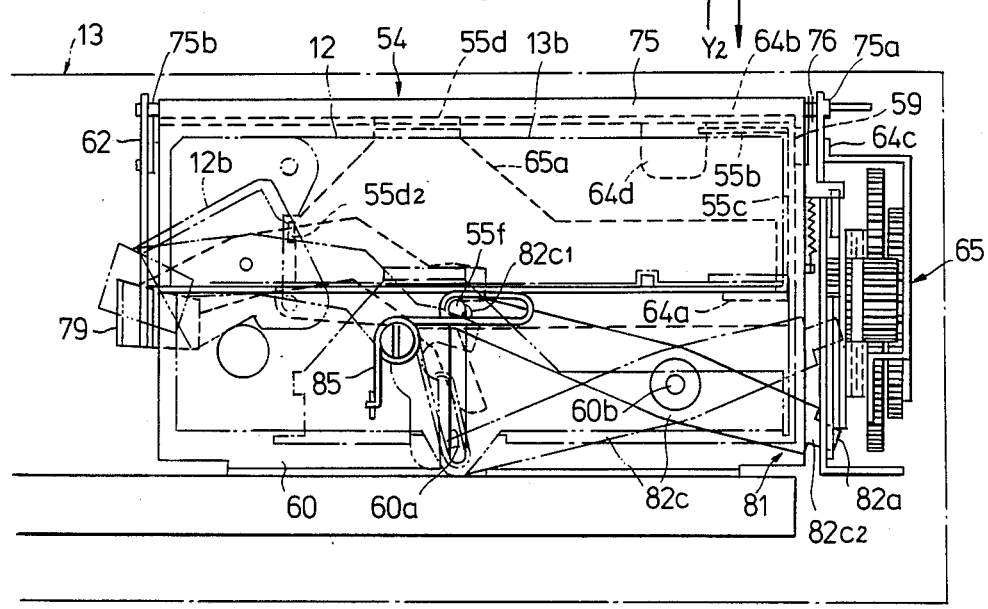
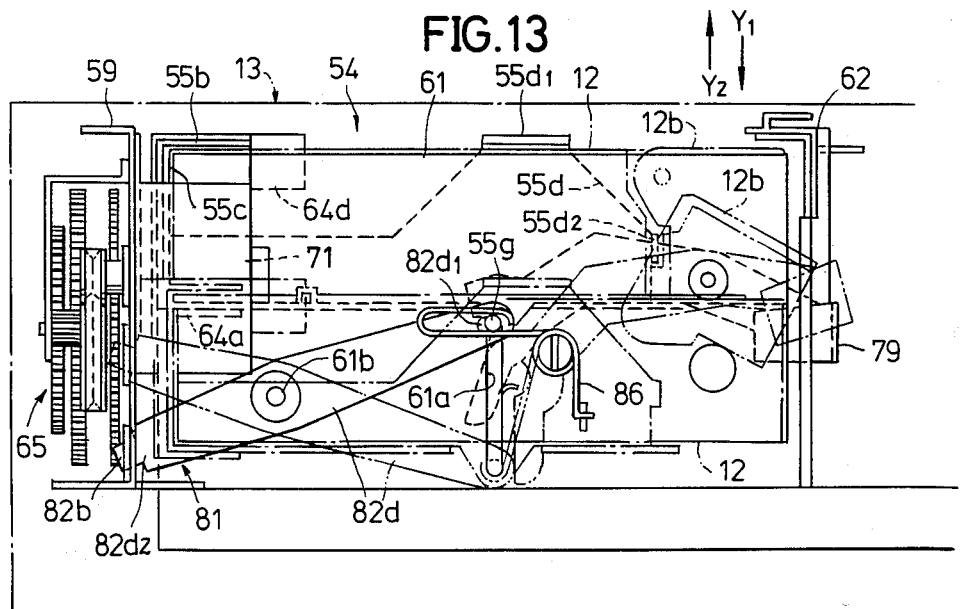

TAPE CASSETTE LOADING AND UNLOADING APPARATUS HAVING A LOCK MECHANISM FOR LOCKING A TAPE CASSETTE IN A LOADING POSITION

The present application is a continuation-in-part application of U.S. patent application Ser. No. 823,381 entitled "TAPE CASSETTE LOADING AND UNLOADING APPARATUS HAVING A LOCK MECHANISM" filed Jan. 28, 1986.

BACKGROUND OF THE INVENTION

The present invention generally relates to tape cassette loading and unloading apparatuses, and more particularly to a tape cassette loading and unloading apparatus provided in a magnetic recording and/or reproducing apparatus and having a holder which is inserted with a tape cassette, a belt-driven transmitting mechanism for moving the holder between a cassette receiving position and a predetermined loading position, and a lock mechanism for locking the transmitting mechanism when the holder reaches the predetermined loading position.

Conventionally, a tape cassette loading and unloading apparatus provided in a magnetic recording and/or reproducing apparatus comprises a holder for receiving a tape cassette which is inserted into the recording and/or reproducing apparatus. The holder is movable between a cassette receiving position where an inserted tape cassette is received and a predetermined loading position where a recording or a reproduction is carried out with respect to a magnetic tape accommodated within the tape cassette. The holder is moved by a rotational driving force of a drive motor transmitted by way of a worm gear coupled to a rotary shaft of the drive motor and a transmitting mechanism coupled to the worm gear and the holder. The worm gear comprises a worm and a worm wheel which meshes with the worm. When the drive motor is stopped at a time when the holder reaches the predetermined loading position during a loading mode or when the holder reaches the cassette receiving position during an unloading mode, a force acts on the holder so as to rotate the worm wheel or rotate toothed wheels of the transmitting mechanism. However, due to the meshing relationship between the worm and the worm wheel which meshes with the worm, the worm wheel does not rotate and the holder is locked in the predetermined loading position or the cassette receiving position. Accordingly, the worm gear also functions as a lock mechanism for locking the holder in the predetermined loading position or the cassette receiving position.

But when the holder is stopped, a load acts on the worm gear. The load acting on the worm wheel or the worm is large and may damage the worm gear. Hence, it is necessary to provide a resilient member in the transmitting mechanism and resiliently absorb the movement in the transmitting mechanism when the holder stops in the predetermined loading position or the cassette receiving position, in order to reduce the load acting on the worm gear when the holder stops. As a result, the construction of the tape cassette loading and unloading apparatus becomes complex.

Accordingly, in a conceivable tape cassette loading and unloading apparatus, it is possible to provide a pulley on the rotary shaft of the drive motor instead of providing the worm gear. In this case, the holder is moved by the rotational driving force of the drive motor which is transmitted by way of the pulley, a belt provided between the pulley and the transmitting mechanism, and the transmitting mechanism. When the holder stops in the predetermined loading position or the cassette receiving position, the belt slips and it is possible to prevent an excessively large load from being applied on the transmitting mechanism.

However, in the case of the holder which is moved by way of the belt-driven transmitting mechanism, the holder in the predetermined loading position may be moved by an external force which acts on the holder. That is, when an external vibration or shock is applied on the holder in the predetermined loading position, the toothed wheels of the transmitting mechanism may rotate and hence rotate the pulley and the drive motor by way of the belt. As a result, there is a problem in that the holder may move from the predetermined loading position and make it impossible to carry out the recording or reproduction on the recording and/or reproducing apparatus.

Moreover, in the case of the holder which is moved by way of the belt-driven transmitting mechanism, it is possible to conceive a construction in which the holder is moved to the predetermined loading position by a rotary member which is driven by the drive motor, the rotary member rotates further against a resilient member when the holder reaches the predetermined loading position so as to push against and keep the holder in the predetermined loading position by an urging force of the resilient member, and the rotary member is locked in this state by a locking member. However, according to this conceivable construction, the load on the rotary member is large because the rotary member moves the holder to the predetermined loading position by the rotary displacement thereof, the rotary member pushes and keeps the holder in the predetermined loading position via the resilient member, and the rotary member is locked by the locking member in the state where the rotary member is rotated against the urging force of the resilient member. In addition, the drive motor must have a large driving force in order to push the holder to the predetermined loading position by the rotary member against the urging force of the resilient member, and there is a problem in that the the drive motor becomes bulky. Furthermore, there is a problem in that the lock member must be provided in addition to a reduction gear mechanism which drives the rotary member.

SUMMARY OF THE INVENTION

Accordingly, it is a general object of the present invention to provide a novel and useful tape cassette loading and unloading apparatus in which the problems described heretofore are eliminated.

Another and more specific object of the present invention is to provide a tape cassette loading and unloading apparatus comprising a holder which is inserted with a tape cassette, a belt-driven transmitting mechanism for moving the holder between a cassette receiving position and a predetermined loading position, and a lock mechanism for locking the transmitting mechanism when the holder reaches the predetermined loading position. According to the tape cassette loading and unloading apparatus of the present invention, it is possible to prevent an excessively large load from being applied to the transmitting mechanism when the holder stops in the predetermined loading position or the cassette receiving position. Further, it is possible to prevent the holder from moving from the predetermined loading position when the holder reaches the predetermined loading position so as to carry out a recording or a reprouction, even when an external force is applied on the holder.

Still another object of the present invention is to provide a tape cassette loading and unloading apparatus in which a pushing member is used to stably maintain the tape cassette to a loaded position without play by a sufficiently large pushing force when the holder inserted with the tape cassette is moved to the predetermined loading position and the transmitting mechanism is positively locked when the holder reaches the predetermined loading position. According to the tape cassette loading and unloading apparatus of the present invention, it is possible to push the tape cassette to the loaded position with a relatively large pushing force because the pushing member is rotated by a driving gear of the transmitting mechanism so as to push a top surface of the tape cassette. As a result, it is possible to positively and stably maintain the tape cassette in the loaded position without play. In addition, since the holder is driven by a gear which has an untoothed part and is in mesh with the driving gear, the operation of pushing the tape cassette and the operation of driving of the holder are divided between two members, that is, the driving gear and the gear with the untoothed part, and it is possible to prevent an excessively large torque from being applied to one member. Moreover, although a relatively large force is required to push the tape cassette to the loaded position, it is unnecessary to use a bulky motor because the the operation of pushing the tape cassette and the operation of driving the holder are divided between the driving gear and the gear with the untoothed part. Furthermore, since the gear with the untoothed part is locked by the driving gear, it is possible to rigidly lock the gear with the untoothed part even when an external force acts on the holder, and the reliability of the apparatus is improved especially from the point of view that the gear with the untoothed part is locked and the holder is accordingly prevented from moving upwardly from the predetermined loading position.

Other objects and further features of the present invention will be apparent from the following detailed description when read in conjunction with the accompanying drawings.

BRIEF DESCRIPTION OF THE DRAWINGS

FIGS. 5 and 6 are a front view and a rear view respectively showing the tape cassette loading and unloading apparatus shown in FIGS. 1 and 2;

FIG. 9 is a side view showing a modification of the tape cassette loading and unloading apparatus according to the present invention;

FIG. 10 is a plan view showing the tape cassette loading and unloading apparatus shown in FIG. 9;

FIG. 11 is a side view showing an essential part of the tape cassette loading and unloading apparatus shown in FIG. 9 for explaining the construction of a transmitting mechanism and a lock mechanism;

FIGS. 12 and 13 are a front view and a rear view respectively showing the tape cassette loading and unloading apparatus shown in FIG. 9;

FIG. 14 is a side view showing the tape cassette loading and unloading apparatus shown in FIG. 9 in a state where a holder is in an insertion completion position;

FIG. 18 is a side view showing an essential part of the tape cassette loading and unloading apparatus shown in FIG. 9 for explaining the operation of the lock mechanism when the tape cassette is moved to the loaded position.

DETAILED DESCRIPTION

Figure 1:
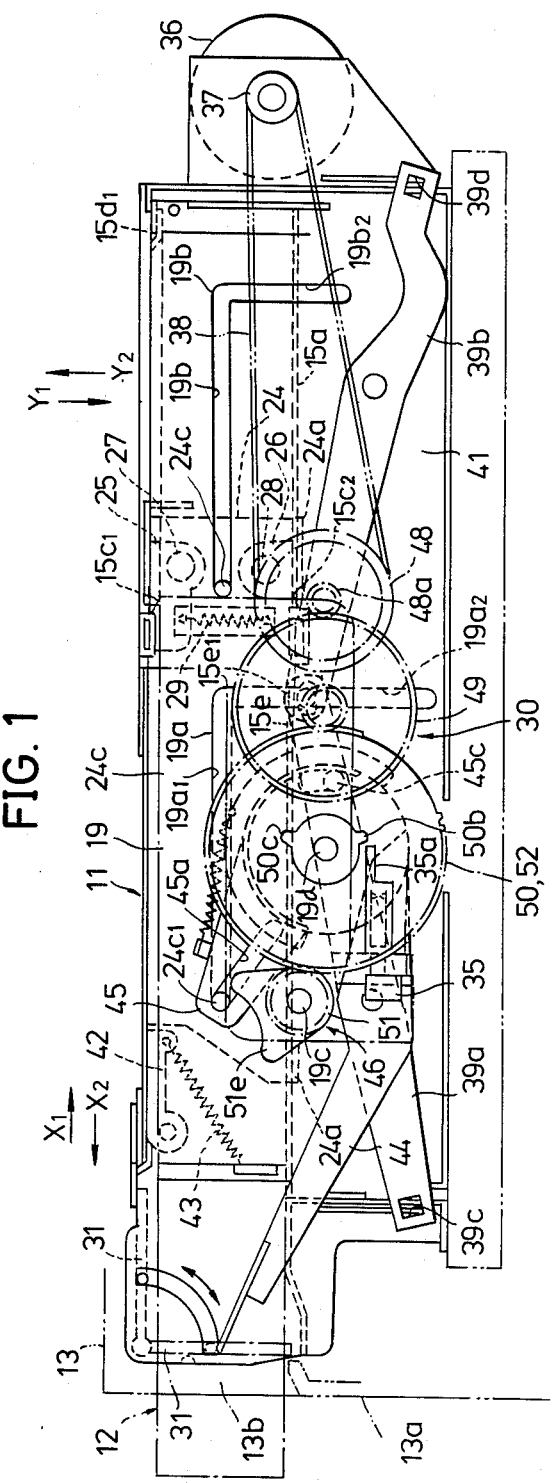
FIGS. 1 and 2 are a side view and a plan view respectively showing an embodiment of the tape cassette loading and unloading apparatus according to the present invention together with a part of a recording and/or reproducing apparatus.
Figure 2:
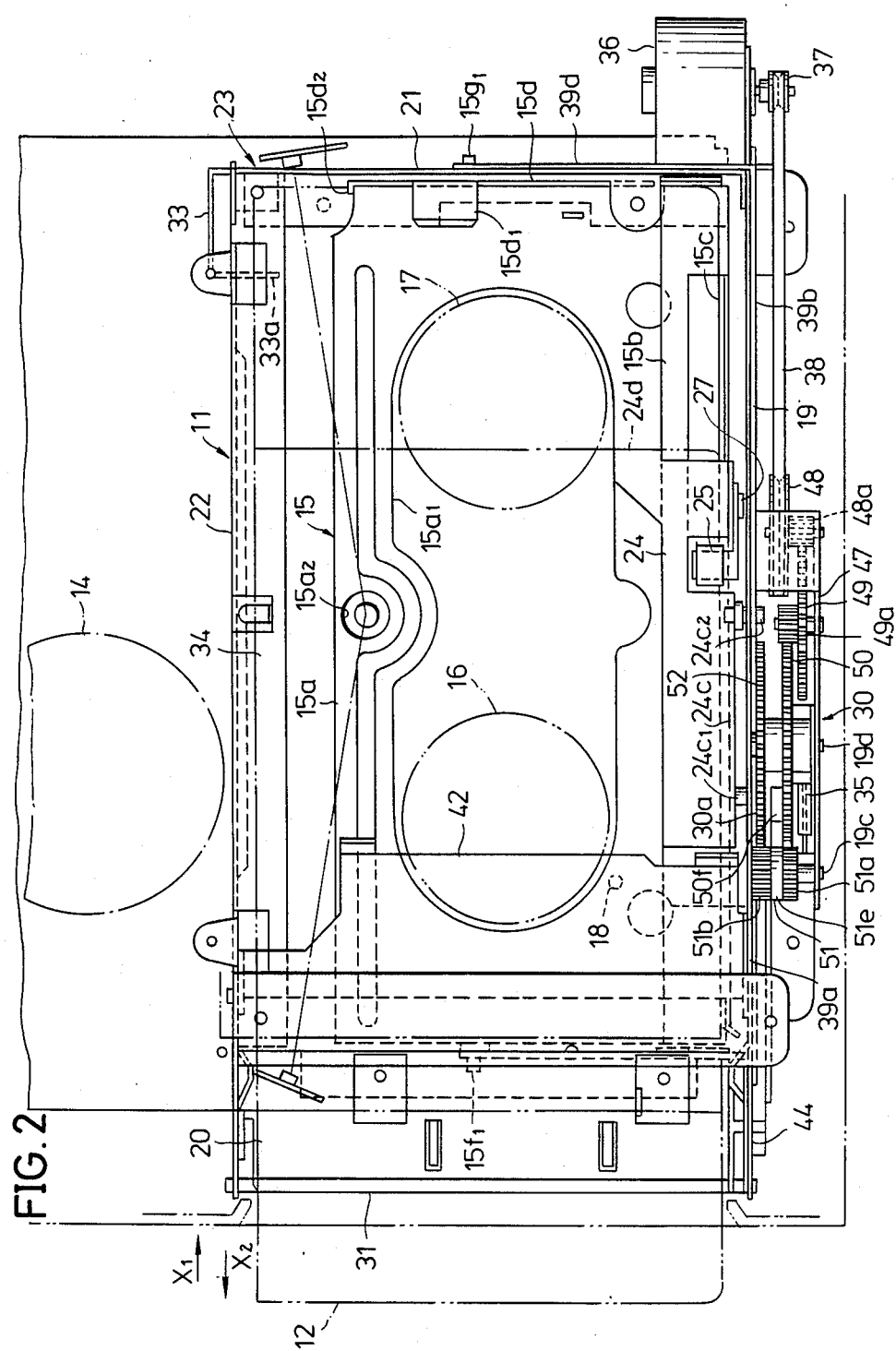
Figure 3A:
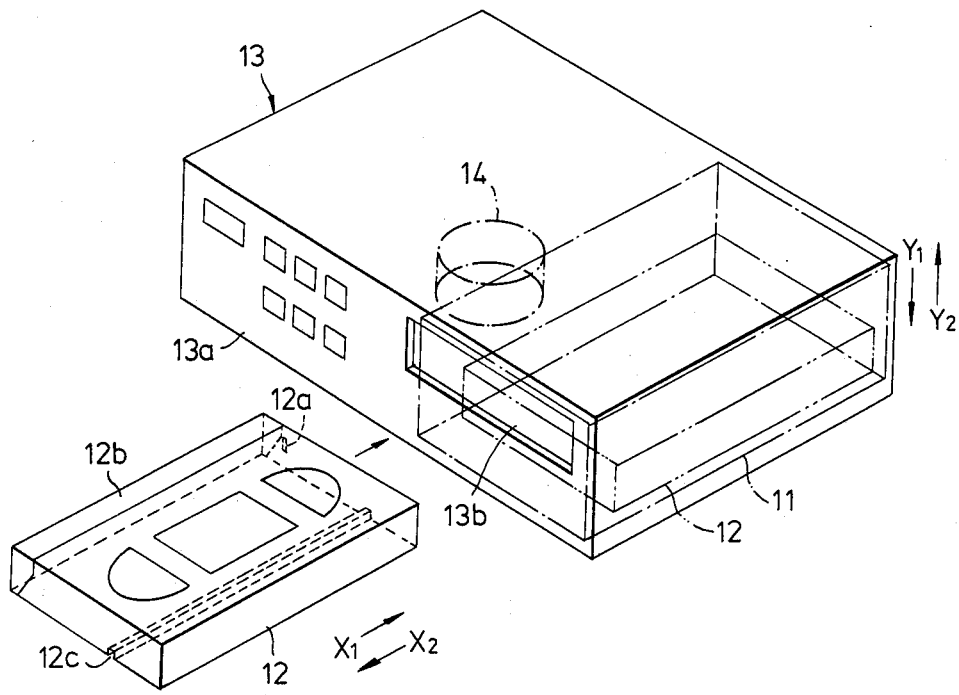
FIGS. 3A and 3B are a perspective view and a side view respectively showing the recording and/or reproducing apparatus together with a tape cassette for explaining an insertion of the tape cassette into the recording and/or reproducing apparatus.
Figure 3B:
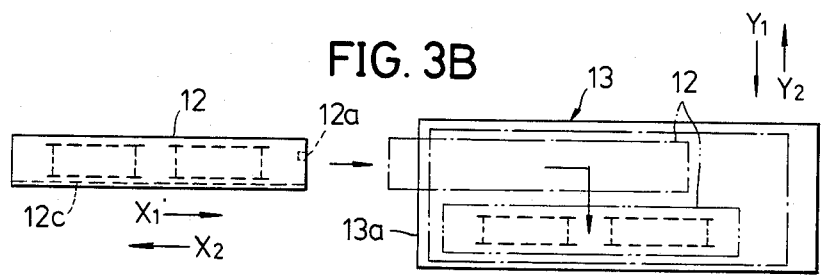

An embodiment of the tape cassette loading and unloading apparatus according to the present invention is shown in FIGS.1 and 2. In FIGS.1 and 2, a tape cassette loading and unloading apparatus 11 is mounted within a magnetic recording and/or reproducing apparatus (hereinafter simply referred to as a VTR) 13. A tape cassette 12 which is played on the VTR 13 has an approximately rectangular parallelepiped shape with top and bottom surfaces respectively having a longer side and a shorter side. As shown in FIGS.3A and 3B, the tape cassette 12 comprises a lid lock release button 12a provided on one side surface thereof, a lid 12b provided on a front thereof along the longitudinal direction of the tape cassette 12, and a groove 12c formed on the bottom surface thereof along the longitudinal direction of the tape cassette 12. The groove 12c is provided at a position offset from the center of the shorter side of the tape cassette 12. The loading and unloading apparatus 11 is mounted within the VTR 13 facing such a direction that the loading and unloading apparatus 11 receives the tape cassette 12 which is inserted from the one side surface thereof having the shorter side. As shown in FIG. 3A, the loading and unloading apparatus 11 is arranged on the right of the VTR 13 so that a width of the loading and unloading apparatus 11 along a front face 13a of the VTR 13 is shorter than a depth of the loading and unloading apparatus 11 along a side surface of the VTR 13. Accordingly, an inserting opening 13b on the front face 13a of the VTR 13 for receiving the tape cassette 12 only needs to have a width which is slightly larger than the shorter side of the tape cassette 12.

A rotary drum 14 is provided on the left of the loading and unloading apparatus 11 in FIG. 3A. When the tape cassette 12 is in a predetermined loaded position within the VTR 13 and the VTR 13 is put into a recording or reproducing mode, for example, a tape loading operation is performed to wrap a magnetic tape (not shown) accommodated within the tape cassette 12 around an outer peripheral surface of the rotary drum 14 over a predetermined angular range. When the tape cassette 12 is inserted into the VTR 13 through the inserting opening 13b from the one side surface thereof having the release button 12a so that the lid 12b is on the left, the tape cassette 12 is carried from a cassette receiving position indicated by a one-dot chain line in FIG. 3B to the predetermined loaded position indicated by a two-dot chain line.

As shown in FIGS. 1, 2, 5, and 6, a holder 15 of the loading and unloading apparatus 11 for receiving the inserted tape cassette 12 is open on the left side thereof, that is, on the left side thereof facing the rotary drum 14 so that the tape loading operation can be performed without being interfered by the holder 15. The holder 15 comprises a bottom plate 15a on which the inserted tape cassette 12 rests, a top plate 15b which faces the top surface of the inserted tape cassette 12, and a side plate 15c connecting the top and bottom plates 15b and 15a. Hence, the holder 15 substantially has a sideways U-shape cross section when viewed in a tape cassette inserting direction X1.

The bottom plate 15a is provided with a generally oval opening 15a1 into which a supply reel base 16 and a take-up reel base 17 of the VTR 13 relatively enter, and a hole 15a2 into which a tape end detection lamp (not shown) of the VTR 13 enters. A projecting pin 18 is also provided on the top surface of the bottom plate 15a at a position deviated from an imaginary line which passes a center of the loading and unloading apparatus 11 and extends along the longitudinal direction of the loading and unloading apparatus 11. The projecting pin 18 engages with the groove 12c of the tape cassette 12 when the tape cassette 12 is inserted into the VTR 13. The projecting pin 18 prevents the tape cassette 12 from being inserted into the VTR 13 facing an incorrect direction, and also guides the inserted tape cassette 12.

A plate part 15d of the bottom plate 15 extends in a direction Y2. This plate part 15d has a bent portion 15d1 which extends in a direction X2 and opposes the top surface of the inserted tape cassette 12, and a bent contact portion 15d2 which also extends in the direction X2 for making contact with the release button 12a of the inserted tape cassette 12. In other words, the contact portion 15d2 is simply a bent integral portion of the plate part 15d of the holder 15 and projects in the direction X2 so as to oppose the release button 12a of the inserted tape cassette 12. The bottom plate 15a has three downwardly projecting portions 15e, 15f, and 15g which project in the direction Y1 from the bottom surface of the bottom plate 15a. The projecting portions 15e, 15f, and 15g respectively have pins 15e1, 15f1, and 15g1 which project outwardly of the holder 15.

Figure 7:
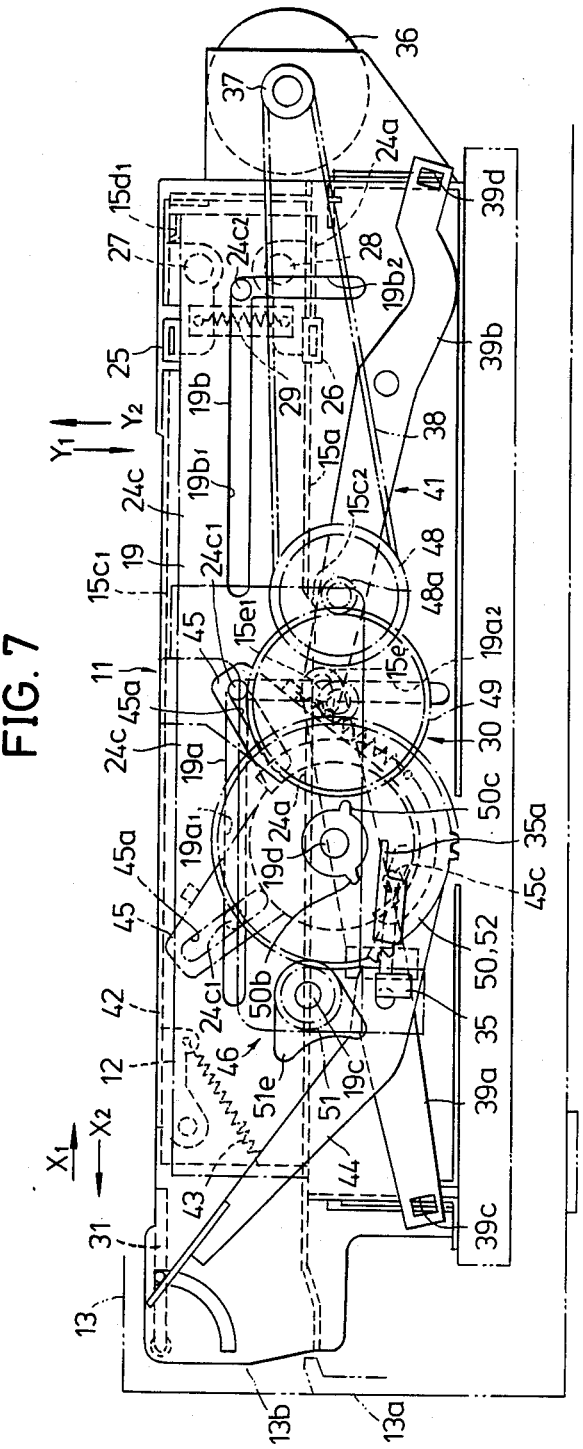
FIG. 7 is a side view showing the tape cassette loading and unloading apparatus shown in FIGS. 1 and 2 in a state where the holder is in an insertion completion position.
Figure 8:
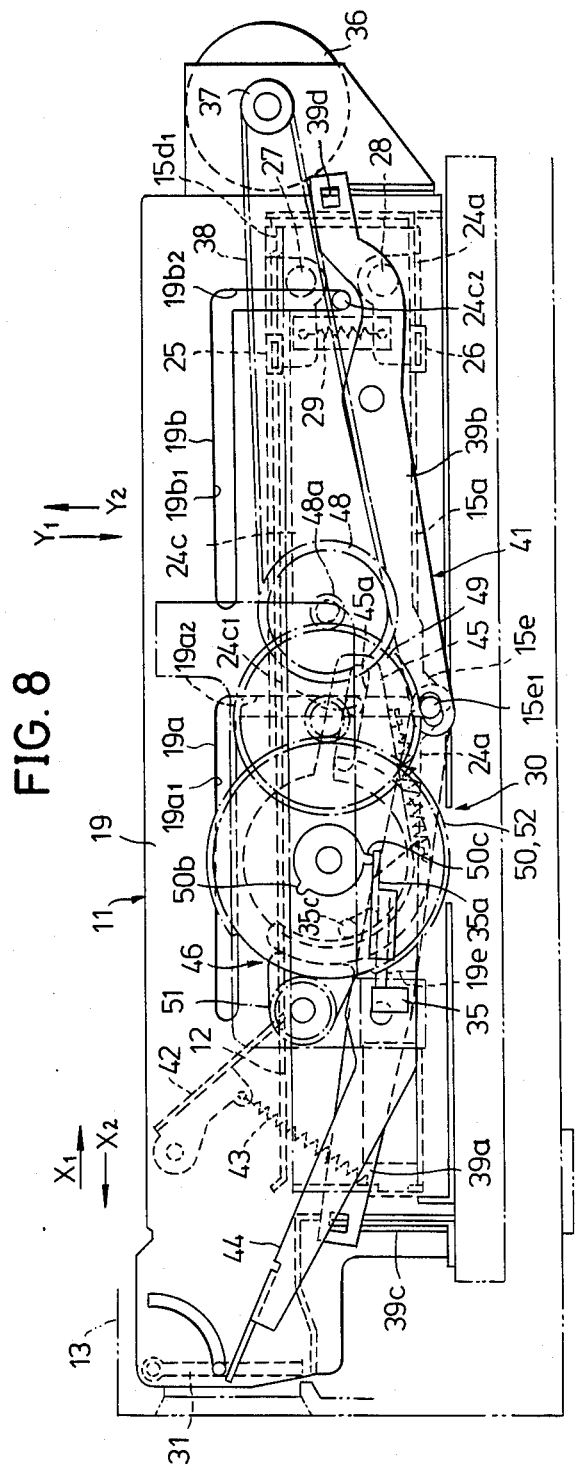
FIG. 8 is a side view showing the tape cassette loading and unloading apparatus in a state where the holder is in the predetermined loading position.

As shown in FIG. 2, the holder 15 is supported within a rectangular frame 23 and is movable horizontally between a cassette receiving position shown in FIG. 1 where the tape cassette 12 is received and an insertion completion position shown in FIG. 7 and is movable vertically between the insertion completion position and a predetermined loading position shown in FIG. 8. When the tape cassette 12 is manually inserted in the cassette inserting direction X1 into the holder 15 in the cassette receiving position from one side surface of the tape cassette having the shorter side and pushes the holder 15 slightly past the cassette receiving position toward the insertion completion position, the holder 15 is automatically moved to the predetermined loading position via the insertion completion position as will be described later. The frame 23 is constituted by brackets 19 through 22 which are connected to each other. The bracket 19 has an L-shaped guide groove 19a for guiding the pin 15e1, the bracket 20 has a guide groove 20a for guiding the pin 15f1, and the bracket 21 has a guide groove 21a for guiding the pin 15g1. The holder 15 slides upwardly and downwardly (directions Y2 and Y1) in a state where the pins 15e1, 15f1, and 15g1 are respectively guided within the guide grooves 19a, 20a, and 21a.

A slide member 24 comprises a bottom part 24a which opposes the bottom surface of the bottom plate 15a of the holder 15, a top part 24b which opposes the upper surface of top plate 15b, and a side part 24c which opposes the outer surface of the side plate 15c as shown in FIG. 5. The slide member 24 substantially has a sideways U-shape cross section when viewed in the tape cassette inserting direction X1. The slide member 24 slides in the directions X1 and X2 along the outer side of the holder 15 when inserting and extracting the tape cassette 12.

As shown in FIG. 1, the side part 24c has on the rear part of the slide member 24 holding members 25 and 26 for respectively holding the top and bottom surfaces of the tape cassette 12 which is inserted into the holder 15 near the one side surface of the tape cassette 12. The slide member 24 has a contact part 24d which is an integral part of the upper part 24b and is formed by bending the upper part 24b downwardly in the direction Y1, and the contact part 24d makes contact with the one side surface of the inserted tape cassette 12. The holding members 25 and 26 are rotatably supported on pins 27 and 28, respectively. A coil spring 29 is stretched across the holding members 25 and 26, and the holding members 25 and 26 are urged to close upon each other by the pulling force of the coil spring 29. Before the tape cassette 12 is inserted into the VTR 13, the holding members 25 and 26 ride over respective sloping parts 15c1 and 15c2 provided on the top and bottom edges of the side plate 15c of the holder 15, and the holding members 25 and 26 are open against the force exerted by the coil spring 29 so as not to make contact with the top and bottom surfaces of the tape cassette 12.

The side part 24c has projecting pins 24c1 and 24c2 projecting outwardly of the slide member 24. The projecting pin 24c1 fits into the L-shaped guide groove 19a, and the projecting pin 24c2 fits into the guide groove 19b. As shown in FIG. 1, the projecting pin 24c1 also engages an elongated hole 45a in a rotary arm 45 of a drive transmitting mechanism 30.

When the rotary arm 45 rotates, the slide member 24 is guided by the guide grooves 19a and 19b and slides horizontally (directions X1 and X2) on the outside of the holder 15. The slide member 24 moves together with the holder 15 when the slide member 24 moves upwardly and downwardly (directions Y2 and Y1).

In the state where the the holder 15 is stationary in the cassette receiving position shown in FIG. 1, the projecting pins 24c1 and 24c2 of the slide member 24 are respectively located at ends of horizontal parts 19a1 and 19b1 of the guide grooves 19a and 19b. Hence, the holder 15 will not move even when an external force is applied on the holder 15 so as to move the holder 15 upwardly or downwardly.

Figure 4A:
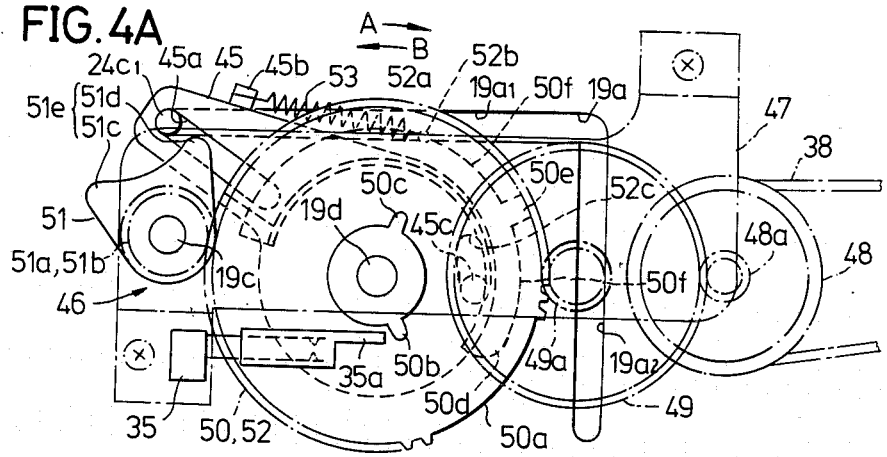
FIG. 4A is a side view showing an essential part of an embodiment of a lock mechanism of the tape cassette loading and unloading apparatus according to the present invention.

FIG. 4A shows an essential part of a lock mechanism. As will be described later, a lock mechanism 46 locks the drive transmitting mechanism 30 when the holder 15 reaches the predetermined loading position.

The drive transmitting mechanism 30 comprises a pulley 48 rotatably provided on a crank shaped bracket 47 which is secured to the bracket 19 by screws, a reducing toothed wheel 49 which meshes with a small toothed wheel 48a on the pulley 48, and a partially toothed wheel 50 supported on a pin 19d on the bracket 19. The partially toothed wheel 50 has an untoothed part 50a and meshes with a small toothed wheel 49a of the reducing toothed wheel 49. The drive transmitting mechanism 30 further comprises a locking toothed wheel 51 supported on a pin 19c on the bracket 19 and having a first toothed wheel part 51a which meshes with the partially toothed wheel 50, and a transmitting toothed wheel 52 which is supported on the pin 19d and meshes with a second toothed wheel part 51b of the locking toothed wheel 51, and the rotary arm 45 which is supported on the pin 19d and is provided between the bracket 19 and the transmitting toothed wheel 52.

The partially toothed wheel 50 has on the outer surface thereof projections 50b and 50c. When the tape cassette 12 is inserted into the holder 15 and the sliding member 24 is moved in the direction X1, the projection 50b activates a motor switch 35 and a drive motor 36 is started by use of an output of the motor switch 35. On the other hand, when the holder 15 reaches the predetermined loading position, the projection 50c activates the motor switch 35 and the drive motor 36 is stopped by use of the output of the motor switch 35. The output of the motor switch 35 is supplied to a control circuit (not shown) and the control circuit supplies a signal to the drive motor 36 for starting or stopping the drive motor 36 responsive to the output of the motor switch 35. The partially toothed wheel 50 has on the inner surface thereof an engaging part 50f which projects in an arcuate shape. This engaging part 50f comprises a semi-circular end portion 50d and a rectangular projecting portion 50e.

As shown in FIGS. 2 and 4A, the locking toothed wheel 51 has an engaging part 51e between the first toothed wheel 51a which meshes with the partially toothed wheel 50 and the second toothed wheel 51b which meshes with the transmitting toothed wheel 52. The engaging part 51e forks into two branches having projecting portions 51c and 51d.

The transmitting toothed wheel 52 has an untoothed part 52a, a hole 52b, and an arcuate elongated hole 52c. A coil spring 53 is stretched across a hook 45b on the rotary arm 45 and the hole 52b in the transmitting toothed wheel 52. A projecting pin 45c on the rotary arm 45 fits into the elongated hole 52c.

Due to the tension in the coil spring 53, the rotary arm 45 is urged to rotate in a direction A and the transmitting toothed wheel 52 is urged to rotate in a direction B. The rotary arm 45 and the transmitting toothed wheel 52 are mutually positioned by the engagement between the projecting pin 45c and the elongated hole 52c. Hence, the rotary arm 45 and the transmitting toothed wheel 52 rotate unitarily due to the engagement of the projecting pin 45c and the elongated hole 52c but the rotary arm 45 and the transmitting toothed wheel 52 can rotate independently of each other against the force exerted by the coil spring 53 in a range in which the projecting pin 45c is movable within the elongated hole 52c.

The lock mechanism 46 is constituted by the partially toothed wheel 50 which is rotated by the drive motor 36, and the locking toothed wheel 51 which meshes with the partially toothed wheel 50 and transmits the driving force to the holder 15. As described before, the partially toothed wheel 50 has the engaging part 50f and the untoothed part 50a, and the locking toothed wheel 51 has the engaging part 51e.

As shown in FIG. 5, an opening and closing lid 31 is provided at the inserting opening 13b. Pins 31a and 31b on both sides of the lid 31 are respectively supported by the brackets 19 and 22. A torsion spring 32 is fitted over the pin 31a normally keeps the lid 31 in a closed state.

A lid opening member 33 is a bent part which is integrally formed on the bracket 21. When the holder 15 is lowered to the predetermined loading position and the inserted tape cassette 12 is accordingly lowered to the loading position within the VTR 13, the lid opening member 33 engages the lower edge of the lid 12b of the tape cassette 12 and opens the lid 12b. The bracket 22 is connected to the upper part of the front bracket 20 and the upper part of the rear bracket 21, and has an opening 34 in a lower part thereof for permitting the tape loading operation to be performed.

Next, description will be given with respect to the operation of the lock mechanism 46 when the tape cassette 12 is inserted and loaded into the VTR 13.

As shown in FIGS. 3A and 3B, the tape cassette 12 is inserted into the inserting opening 13b from the one side surface of the tape cassette 12 provided with the release button 12a, and is pushed in the cassette inserting direction X1. Hence, the lid 31 at the inserting opening 13b is pushed by the one side surface of the tape cassette 12 and is opened against the force exerted by the torsion spring 32, and the tape cassette 12 is inserted into the holder 15.

As shown in FIG. 2, the projecting pin 18 on the bottom plate 15a fits into the groove 12c of the bottom surface of the tape cassette 12 when the tape cassette 12 is inserted into the holder 15, and an erroneous insertion of the tape cassette 12 facing an incorrect direction is prevented.

The tape cassette 12 is permitted to be inserted into the holder 15 in the cassette receiving position only when the projecting pin 18 can fit into the groove 12c of the tape cassette 12. The projecting pin 18 positively prevents the tape cassette 12 from being inserted facing the incorrect direction because the projecting pin 18 will not coincide with the groove 12c when the tape cassette 12 is inserted facing the incorrect direction.

The tape cassette 12 is inserted in the direction X1 under the guidance of the projecting pin 18 and makes contact with the contact part 24d of the slide member 24.

When the other side surface of the tape cassette 12 is pushed to a position where this other side surface of the tape cassette 12 substantially coincides with the front face 13a of the VTR 13, the slide member 24 is pushed by the tape cassette 12 and is slid in the direction Xl. As the slide member 24 slides in the direction Xl, the holding members 25 and 26 pass the respective sloping parts 15c1 and 15c2 of the holder 15 and close upon each other by the action of the spring 29. Accordingly, the top and bottom surfaces of the tape cassette 12 are respectively held by the holding members 25 and 26.

Figure 4B:
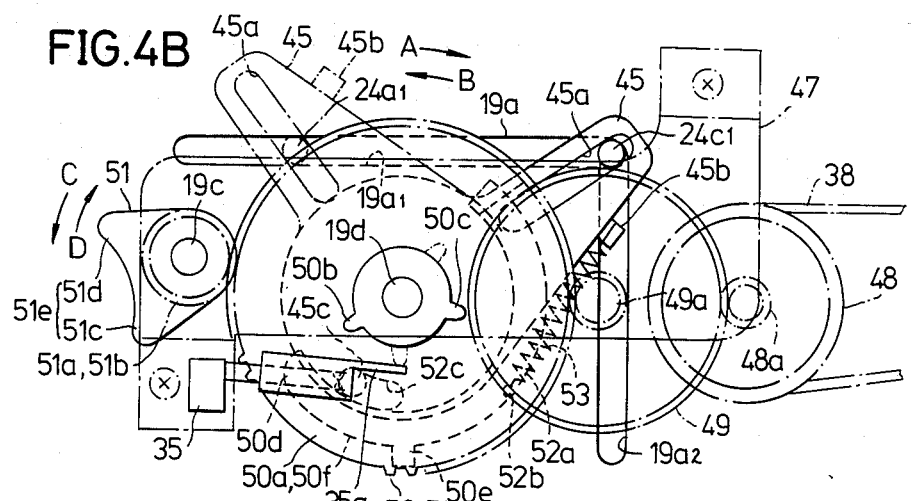
FIG. 4B is a side view showing the lock mechanism in a state where the tape cassette is inserted into a holder of the tape cassette loading and unloading apparatus.

Next, as shown in FIGS.4B and 7, the pin 24c1 of the slide member 14 rotates the rotary arm 45 clockwise as the slide member 24 slides in the direction Xl, and the projection 50b of the drive transmitting mechanism 30 makes contact with a contact piece 35a of the motor switch 35 so as to activate (for example, turn ON) the motor switch 35. In addition, when the slide member 24 slides in the direction Xl due to the insertion of the tape cassette 12, the rotary arm 45 of the drive transmitting mechanism 30 rotates in the direction A due to the engagement of the pin 24c1 and the elongated hole 45a. As a result, the rotary arm 45 rotates the transmitting toothed wheel 52, the locking toothed wheel 51, the partially toothed wheel 50, the reducing toothed wheel 49, the pulley 48, a belt 38, a pulley 37, and the drive motor 36.

The drive motor 36 mounted on the end part of the bracket 19 is started responsive to the turning ON of the motor switch 35, and the rotational driving force of the drive motor 36 is transmitted by way of the pulley 37 and the belt 38 to the pulley 48 of the drive transmitting mechanism 30.

The rotary arm 45 is rotated clockwise by the rotational driving force of the drive motor 36 which is transmitted by way of a reduction gear constituted by the toothed wheel and the like of the drive transmitting mechanism 30, and moves the slide member 24 to the insertion completion position shown in FIG. 7. The tape cassette 12 is moved in the direction Xl together with the slide member 24 in the state where the top and bottom surfaces of the tape cassette 12 are respectively held by the holding members 25 and 26.

When the tape cassette 12 is drawn into the holder 15 and reaches the insertion completion position, the release button 12a of the tape cassette 12 makes contact with the contact portion 15d2 and is pushed to a lock release position. Further, the top surface of the tape cassette 12 in the vicinity of the one side surface thereof opposes the bent portion 15d1. When the release button 12a is pushed by the contact portion 15d2, the locking of the lid 12b is released.

As the rotary arm 45 further rotates clockwise, the pins 24c1 and 24c2 of the slide member 24 respectively move along the horizontal parts 19a1 and 19b1 of the guide grooves 19a and 19b. As shown in FIG. 8, the tape cassette 12 within the holder 15 is lowered in the direction Yl to the predetermined loaded position together with the slide member 24 which moves along vertical parts 19a2 and 19b2 of the guide grooves 19a and 19b.

When the tape cassette 12 moves downwardly, the lower edge of the lid 12b makes contact with sloping surface 33a of the lid opening member 33, and the lid 12b is relatively pushed upwardly and opened as shown in FIGS.5 and 6. In addition, a synchronizing mechanism 41 of the loading and unloading apparatus 11 maintains the bottom plate 15a of the holder 15 in a horizontal state as the holder 15 is moved downwardly (and upwardly). The synchronizing mechanism 41 comprises arms 39a and 39b pivotally supported on the bracket 19, an arm 39c pivotally supported on the bracket 20, and an arm 39d pivotally supported on the bracket 21. The arms 39a and 39b respectively have one end thereof engaging with the pin 15e1 of the holder. The arm 39c has one thereof engaging with the pin 15f1 and another end thereof linked to another end of the arm 39a. The arm 39d has one end thereof engaging with the pin 15g1 and another end thereof linked to another end of the arm 39b. The synchronizing mechanism 41 links the pins 15e1, 15f1, and 15g1 so that the height position of the holder 15 is maintained constant at the pins 15e1, 15f1, and 15g1 when the holder 15 moves downwardly (and upwardly).

When the holder 15 reaches the predetermined loading position, the lid 12b is opened, the pin 24c2 makes contact with the lower end of the vertical part 19b2 of the guide groove 19b, and the holder 15 is stopped in the predetermined loading position. The rotational driving force is transmitted to the transmitting toothed wheel 52 even after the pin 24c2 hits the lower end of the vertical part 19b2. For this reason, the transmitting toothed wheel 52 rotates further in the direction A against the pulling force of the coil spring 53 with respect to the rotary arm 45 which is stationary together with the holder 15. Hence, due to the further rotation of the transmitting toothed wheel 52, the pushing force of the rotary arm 45 acting downwardly on the sliding member 24 becomes large, and the holder 15 is stably and positively positioned in the predetermined loading position.

the pulling force of the coil spring 53 pushes the holder 15 downwardly at the pin 15e1 by way of the rotary arm 45 and the slide member 24. Further, the pulling force of the coil spring 53 pushes the holder 15 downwardly at the pins 15e1, 15f1, and 15g1 by way of the arms 39a through 39d. This is the reason why the holder 15 is stably and positively positioned in the predetermined loading position.

Figure 4C:
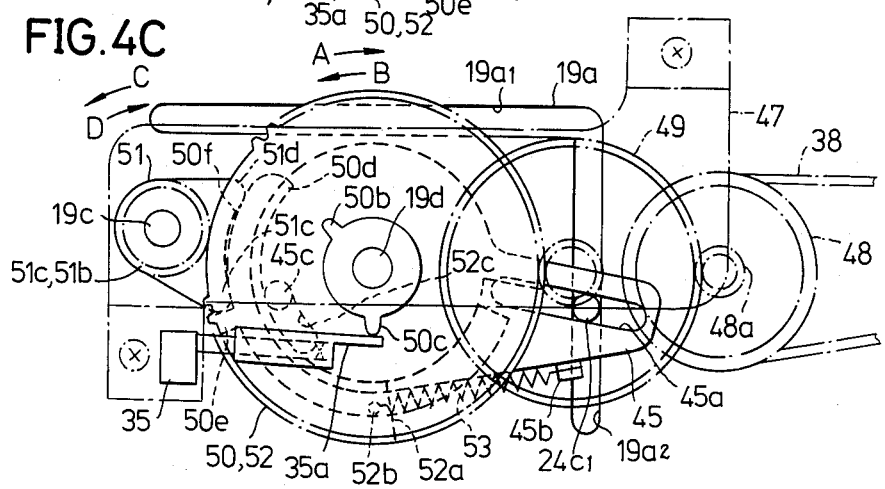
FIG. 4C is a side view showing the lock mechanism in a state where the holder is in a predetermined loading position and is locked, by the lock mechanism.

The untoothed part 50a of the partially toothed wheel 50 opposes the first toothed wheel part 51a of the locking toothed wheel 51, and the locking toohted wheel 51 which rotates in a direction C and the transmitting toothed wheel 52 stop at positions shown in FIGS. 8 and 4C. The projecting portions 51c and 51d wait at a waiting position facing the center of the partially toothed wheel 50, and the engaging part 50f of the partially toothed wheel 50 which rotates in the direction A makes contact with the projecting portions 51c and 51d in the waiting position. In other words, the end portion 50d of the engaging part 50f of the partially toothed wheel 50 passes the projecting portion 51c of the locking toothed wheel 51 which is stationary, and the partially toothed wheel 50 stops when the projecting porltion 50e hits the projecting portion 51d. The projection 50c hits the contact piece 35a of the motor switch 35 to activate (for example, turn ON) the motor switch 35 substantially at the same time as when the partially toothed wheel 50 stops. Thus, the motor switch 35 is turned ON and the drive motor 36 is stopped by use of the output of the motor switch 35.

The projecting portion 51d of the locking toothed wheel 51 makes contact with the end portion 50d of the engaging part 50f of the partially toothed wheel 50, and the locking toothed wheel 51 is prevented from rotating in a direction D. On the other hand, the projecting portion 51c makes contact with the projecting portion 50e of the engaging part, and the locking toothed wheel 51 is prevented from rotating in the direction C. That is, the locking toothed wheel 51 is locked in a non-rotatable state shown in FIGS. 4C and 8 by the engaging part 50f. Accordingly, even when an external force such as an external vibration of external shock is applied on the VTR 13 and the holder 15 receives a force which urges the holder 15 to move upwardly (or downwardly), the holder 15 is positively locked in the predetermined loading position by the locking performed by the locking toothed wheel 51 of the lock mechanism 46. Therefore, according to the loading and unloading apparatus 11, it is possible to prevent an excessively large load from being applied to the drive transmitting mechanism 30 when the holder 15 stops in the predetermined loading position or the cassette receiving position becasue the drive transmitting mechanism 30 is belt driven. Further, although the drive transmitting mechanism 30 is belt driven, it is possible to prevent the holder 15 from moving from the predetermined loading position when the holder 15 reaches the predetermined loading position so as to carry out a recording or a reproduction, even when an external force is applied on the holder 15.

A pushing member 42 is pivotally supported between the brackets 19 and 22. A coil spring 43 is stretched across the holder 15 and the pushing member 42, and the pushing member 42 is urged to rotate clockwise by the force exerted by the coil spring 43 when the holder 15 moves downwardly to the predetermined loading position. Thus, the pushing member 42 pushes against the top surface of the tape cassette 12 within the holder 15 in the predetermined loading position, and the tape cassette 12 is positioned in the loaded position without play.

Next, when a tape cassette ejecting (unloading) operation is performed, the drive motor 36 rotates in a direction opposite to that at the time of the tape cassette inserting (loading) operation, and the drive transmitting mechanism 30 is driven so that the rotary arm 45 rotates counterclockwise (direction B) in FIG. 4C When the drive motor 36 rotates in the opposite direction, the partially toothed wheel 50 rotates in the direction B, and the engaging part 50f hits the projections 51c and 51d and rotates the locking toothed wheel 51 from the locking position so as to unlock the holder 15. Then, the partially toothed wheel 50 rotates and the untoothed part 50a separates from the position opposing the first toothed wheel part 51a of the locking toothed wheel 51. As a result, the partially toothed wheel 50 meshes with the first toothed wheel part 51a and rotates the rotary arm 45 in the direction B by way of the locking toothed wheel 51 and the transmitting toothed wheel 52. Due to the rotation of the rotary arm 45 in the direction B, the holder 15 moves upwardly in the direction Y2 along the guide grooves 19a and 19b and reaches the insertion completion position. The holder 15 further moves horizontally in the direction X2. When the holder 15 is returned to the cassette receiving position, the holding members 25 and 26 ride over the respective sloping parts 15c1 and 15c2 and separate from the top and bottom surfaces of the tape cassette 12 so as to release the holding of the tape cassette 12. The tape cassette 12 is ejected to such an eject position that the other side surface of the tape cassette 12 projects from the inserting opening 13b of the VTR 13.

The projection 50b of the partially toothed wheel 50 hits the contact piece 35a and turns the motor switch 35 ON when the tape cassette ejecting operation is performed. However, the control circuit described before is designed so as not to stop the drive motor 36 responsive to the output of the motor switch 35 in this case. As a result, the drive transmitting mechanism 30 is driven until the tape cassette 12 is ejected to the eject position.

When ejecting the tape cassette 12, the pin 45a of the rotary arm 45 hits and rotates a lid opening member 44 clockwise while the holder 15 moved from the predetermined loading posiltion to the insertion completion position, so that the lid 31 is opened. Hence, when the tape cassette 12 is ejected through the inserting opening 13b, the lid 31 is open and will not interfere with the ejection of the tape cassette 12.

In the embodiment described heretofore, the loading and unloading apparatus 11 is applied to the VTR 13 having such a construction that the tape cassette 12 is inserted into the inserting opening 13b from the one side surface of the tape cassette 12. However, the loading and unloading apparatus of the present invention is not limited to the application to such a VTR, and may be applied to a VTR having such a construction that the tape cassette 12 is inserted from the front thereof having the lid 12b, for example.

Next, description will be given with respect to a modification of the tape cassette loading and unloading apparatus according to the present invention by referring to FIGS. 9 through 18. As shown in FIGS 9 amd 10, a transmitting mechanism 65 is provided on a bracket 59 of a tape cassette loading and unloading apparatus 54. In addition, as shown in FIG. 11, the transmitting mechanism 65 comprises a rotary arm 66, a driving gear 67, a reduction gear 68 and a pulley 69.

The rotary arm 66 has an elongated hole 66a, and a projecting pin 64c1 of a slide member 64 engages into the elongated hole 66a. Accordingly, the slide member 64 slides on the outside of a holder 55 under guidance of L-shaped guide grooves 59a and 59b when the rotary arm 66 rotates, and the slide member 64 moves together with the holder 55 when the slide member 64 moves upwardly and downwarly. In addition, the rotary arm 66 comprises a gear 66c having an untoothed part 66b, project6ions 66d and 66e projecting from both ends of the gear 66c, an engaging pin 66f projecting from the surface of the gear 66c, and a contact pin 66g. The rotary arm 66 is rotatably supported on a pin 59c of the bracket 59.

The driving gear 67 comprises as an integral part thereof a small diameter gear 67a which meshes with the gear 66c and a large diameter gear 67b. The driving gear 67 is supported on a pin 70a (coinciding with a pin 55e of the holder 55 in FIG. 9) of a mounting plate 70 which is indicated by aone-dot chain line and is secured on the bracket by screws. As indicated by phantom lines in FIG. 11, the driving gear 67 comprises a lock groove 67c for locking the engaging pin 66f of the rotary arm 66 when the holder 55 is lowered to a predetermined loading position, and a cam groove 67d into which a projecting pin 74a of a pushing member 74 enters, The lock groove 67c and the cam groove 67d are formed on the flat portion of the large diameter gear 67b. Hence, a lock mechanism is constituted by the engaging pin 66f of the rotary arm 66 and the lock groove 67c of the driving gear 67. The pushing member 74 will be described later.

The reduction gear 68 comprises a small diameter gear 68a which meshes with the large diameter gear 67b of the driving gear 67 and a large diameter gear 68b. The reduction gear 68 is supported on a pin 59d of the bracket 59. The pulley 69 comprises as an integral part thereof a small diameter gear 69a which meshes with the large diameter gear 68b of the reduction gear 68. A belt 73 is provided between the pulley 69 and a pulley 72 which is fixed to a rotary shaft of a drive motor 71.

Accordingly, the rotational driving force of the drive motor 71 is transmitted to the pulley 69 of the transmitting mechanism via the pulley 72 and the belt 73, and is thereafter transmitted to the rotary arm 66 via the reduction gerar 68 and the driving gear 67. Hence, the rotary arm 66 is driven at a predetermined rotational speed so as to move the slide member 64 horizontally and to move the slide member 64 vertically together with the holder 55.

The projecting pin 74a of the pushing member 74 projects through an arcuate groove 59e of the bracket 59. Pins 74b provided on both sides of the pushing member 74 are supported by the bracket 59 and a bracket 62. A leaf spring 74c which made contact with the top surface of the inserted tape cassette 12 is provided at a tip end of the pushing member 74.

A shown in FIG. 9, a lind 75 is provided at the inserting opening 13b. Pins 75a and 75b on both sides of the lid 75 are supported by the respective brackets 59 and 62, and the lid 75 is normally closed by the action of a torsion spring 76 fitted on the pin 75a.

A contact member 77 is rotatably supported by a pin 78. The contact member 77 comprises a contact portion 77a which can make contact with a rear surface of the lid 75 and a portion 77b which extends on the outside of the bracket 59 through an arcuate hole 59i in the bracket 59. When the holder 55 is in a cassette receiving position where the tape cassette 12 can be inserted or ejected, the contact member 77 is in contact with an upper surface of a top plate 55b of the holder 55 and is at a position rotated clockwise. For this reason, the contact portion 77a of the contact member 77 is at a raised position where the contact portion 77a does not interfere with the insertion or ejection of the tape cassette 12.

As will be described later, the contact member 77 rotates counterclockwise due to its own weight as the holder 55 moves downwardly to the predetermined loading position. Thus, in this case, the contact portion 77a is at a lowered position confronting the lid 75.

A lid opening member 79 is supported on a bracket 61. The lid opening member 79 makes contact with the lower edge of the lid 12b of the tape cassette 12 which is lowered to the loaded position and opens the lid 12b.

As shown in FIGS.9, 10, 12 and 13, the tape cassette loading and unloading apparatus 54 is provided with an up-down movement synchronizing mechanism 81. This synchronizing mechanism 81 is provided as a linking mechanism for linking the pin 55e located at the center of the longer side of a bottom plate 55a of the holder 55 and pins 55f and 55g located on the shorter sides of the bottom plate 55a, so that the longer side and the shorter sides of the bottom plate 55a are maintained at identical height positions when the holder 55 is moved upwardly and downwardly.

The synchronizing mechanism 81 comprises levers 82a and 82b rotatably supported on respective pins 59f and 59g of the bracket 59, a lever 82c rotatably supported on a pin 60b of a bracket 60, and a lever 82d rotatably supported on a pin 61b of the bracket 61. The lever 82a comprises an arm 82a2 which has a rectangular engaging hole 82a1 formed at a tip end part thereof and rotates between the outside of the bracket 59 and a lid opening lever 83, and an arm 82a3 which is cranked toward the inside of the bracket 59 and extends in the direction of an arrow X1 by penetrating an opening 59h in the bracket 59. The arm 82a3 has an oval hole 82a4 at a tip end part thereof and is rotatable between the inside of the bracket 59 and the holder 55. Accordingly, the pin 55e of the holder 55 engages the hole 82a4 in the lever 82a on the inside of the bracket 59. A hook 82a5 is formed on the tip end of the arm 82a3, and a coil spring 84 is provided between the hook 82a5 and the pushing member 74.

The lever 82b comprises an arm 82b2 which has a rectangular engaging hole 82b1 formed at a tip end thereof and has an arcuate shape so as not to make contact with a pin 64c2 which moves within the guide groove 59b, and an arm 82b3 which extends in the direction of an arrow X2 so that the arm 82b3 can rotate between the outside of the bracket 59 and the transmitting mechanism 65. The arm 82b3 has an oval hole 82b4 at a tip end part thereof. The pin 55e of the holder 55 engages the hole 82b4 in the lever 82b on the outside of the bracket 59.

As shown in FIG. 12, the lever 82c has on one end thereof an oval hole 82c1 into which the pin 55f of the holder 55 engages, and has on the other end thereof an engaging part 82c2 which engages the engaging hole 82a1 in the lever 82a. In addition, the lever 82d similarly has on one end thereof an oval hole 82d1 into which the pin 55g of the holder 55 engages, and has on the other end thereof an engaging part 82d2 which engages the engaging hole 82b1 in the lever 82b.

Hence, the pin 55e of the holder 55 is linked to the pins 55f and 55g via the levers 82a through 82d. For this reason, each of the levers 82a through 82d is linked to the vertical movement of the holder 55, and the pins 55e, 55f and 55g are maintained at identical height positions so that the bottom plate 55a of the holder 55 is kept horizontal due to the rotary displacement of the levers 82a through 82d.

Torsion springs 85 and 86 are provided on the brackets 60 and 61 so as to push the pins 55f and 55g of the holder 55 in the direction of an arrow Y2. The bracket 59 is provided with a motor switch 87 which is closed upon contact with the projection 66d or 66e of the rotary arm 66.

Next, description will be given with respect to the operation of inserting the tape cassette 12 into the tape cassette loading and unloading apparatus 54. As shown in FIGS.3A and 3B, the tape cassette 12 is inserted into the inserting opening 13b from the side surface of the tape cassette 12 having the lid lock release button 12a first. The side surface of the tape cassette 12 having the button 12a pushes the lid 75 and opens the lid 75 against the force of the spring 76. When the tape cassette 12 is inserted to such a position that the side surface of the tape cassette 12 opposite to the side surface having the button 12a substantially coincides with the front face 13a of the VTR 13, the slide member 64 is pushed by the tape cassette 12 and is moved in the direction X1.

Figure 15:
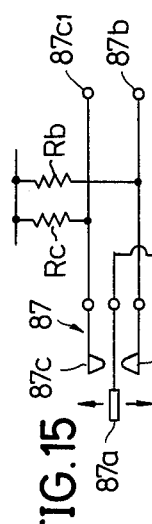
FIG. 15 is a circuit diagram showing the circuit construction of a motor switch shown in FIG. 9.
Figure 16:
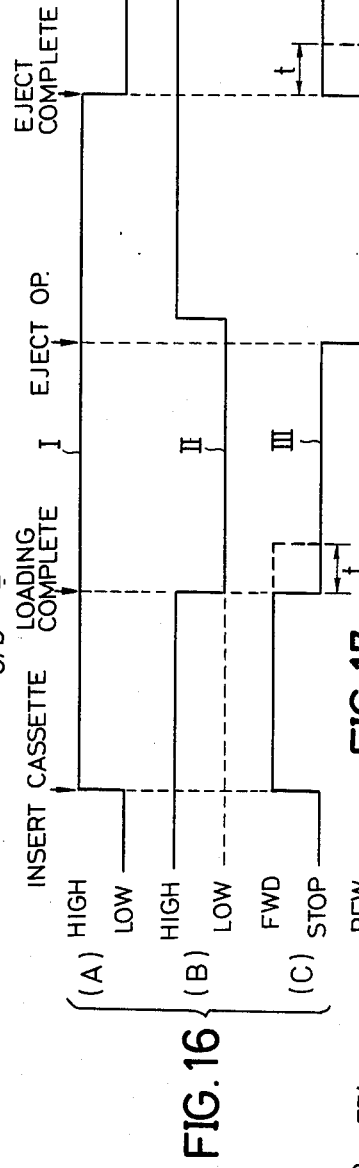
FIGS. 16(A) through 16(C) are timing charts for explaining the operation of the motor switch in relation to the operation of a motor.

As shown in FIG. 15, the motor switch 87 comprises a contact piece 87a which is grounded, and contacts 87b and 87c. The switch 87 is open when the contact piece 87a is connected to neither one of the contacts 87b and 87c. Until the tape cassette 12 is inserted, the projection 66d of the rotary arm 66 is in contact with the contact piece 87a, and the switch 87 is closed in a state where the contact piece 87a is connected to the contact 87c.

As the slide member 64 moves in the direction X1, the pin 64c1 rotates the rotary arm 66 clockwise and the projection 66d of the rotary arm 66 separates from the contact piece 87a to open the switch 87. When the switch 87 is opened, a high-level signal from a resistor Rc is obtained from a terminal 87c1 of the switch 87 and a high-level signal from a resistor Rb is obtained from a terminal 87b1 of the switch 87. The terminals 87c1 and 87b1 of the switch 87 are coupled to a control circuit (not shown) for controlling the operation of the tape cassette loading and unloading apparatus 54. Hence, the drive motor 71 is driven to rotate in the forward direction as indicated by III in FIG. 16(C) by a signal from the control circuit responsive to the high-level signal I shown in FIG. 16(A) from the terminal 87c1. FIGS.16(A) through 16(C) are time charts respectively showing the high and low level timings of the signal I at the terminal 87c1, a signal II at the terminal 87b 1, and the rotating state of the drive motor 71.

Accordingly, when the switch 87 is opened, the drive motor 71 mounted on the end part of the bracket 59 is rotated, and the rotational driving force of the drive motor 71 is transmitted to the pulley 69 of the transmitting mechanism 65 via the pulley 72 and the belt 73.

The rotary arm 66 is rotated clockwise by the rotational driving force of the drive motor 71 which is reduced by the gears 69a, 68b, 68a, 67b, 67a and the like of the transmitting mechanism 65, and the slide member 64 is moved to an insertion completion position shown in FIG. 14. The tape cassette 12 is moved in the direction X1 together with the slide member 64 in a state where the top and bottom surfaces of the tape cassette 12 are held by holding members (not shown).

Figure 17:
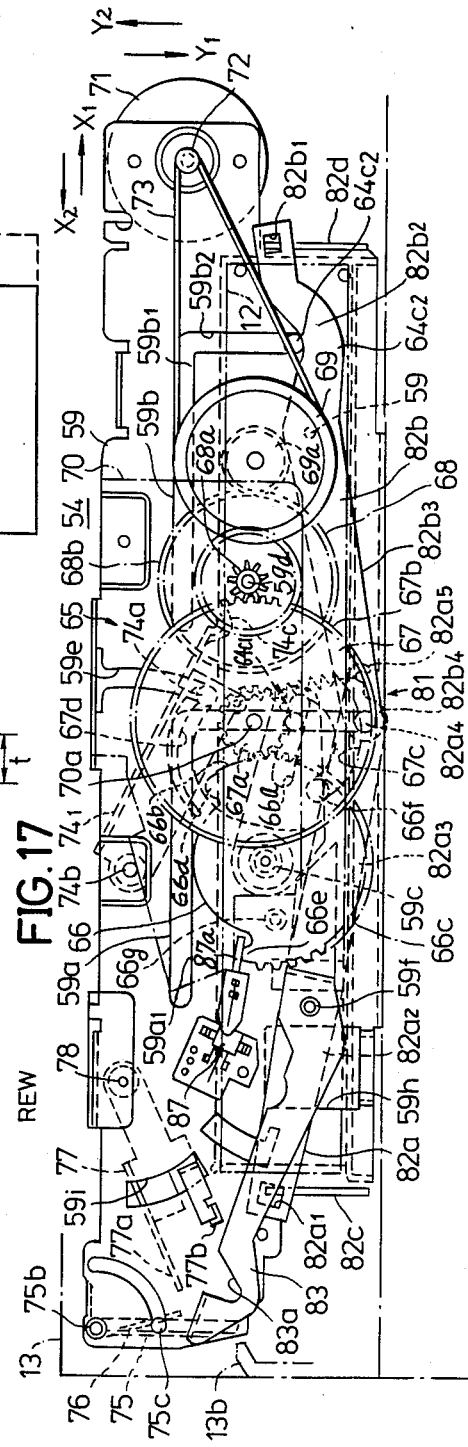
FIG. 17 is a side view showing the tape cassette loading and unloading apparatus shown in FIG. 9 in a state where the tape cassette is moved to a loaded position.

When the tape cassette 12 is inserted into the holder 55 and reaches the insertion completion position, the button 12a makes contact with a contact portion 55d2 of the holder 55 and is displaced to a lock release position. In addition, the top surface of the tape cassette 12 in the vicinity of the side surface having the button 12a confront a bent portion 55d1 of the holder 55. In addition, when the rotary arm 66 rotates clockwise, the pins 64c1 and 64c2 of the slide member 64 move downwardly from horizontal portions 59a1 and 59b1 of the guide grooves 59a and 59b to vertical portions 59a2 and 59b2 of the guide grooves 59a and 59b. As shown in FIG. 17, the tape cassette 12 inserted into the holder 55 is lowered in the direction Y1 together with the slide member 64 which moves along the guide grooves 59a and 59b until the tape cassette 12 reaches the loaded position.

As the holder 55 moves downwardly from the insertion completion position shown in FIG. 14 to the predetermined loading position shown in FIG. 17, the pin 55e of the holder 55 is guided by the vertical portion 59a2 of the guide groove 59a and moves in the direction Y1. As the pin 55e moves downwardly, the levers 82a and 82b engaged by the pin 55e respectively rotate clockwise and counterclockwise about the respective pins 59f and 59g. Furthermore, the levers 82c and 82d engaged to the levers 82a and 82b are respectively displaced from positions indicated by solid lines in FIGS.12 and 13 to positions indicated by two-dot chain lines in accordance with the rotation of the levers 82a and 82b.

Hence, as the pin 55e moves downwardly, the levers 82a through 82d synchronize the pins 55f and 55g so that the pins 55f and 55g are maintained to height positions identical to that of the pin 55e. When the holder 55 moves downwardly, the lever 82a rotates clockwise following the displacement of the pin 55e. For this reason, the hook 82a 5 of the lever 82a pulls one end of the coil spring 84 which has the other end thereof hooked to the pushing member 74. In other words, the pushing member 74 is rotated clockwise by the action of the coil spring 84, and the leaf spring 74c on the tip end of the pushing member 74 makes contact with the top surface of the tape cassette 12.

As the rotary arm 66 is driven and rotated clockwise, the holder 55 moves downwardly and the pushing member 74 rotates clockwise to push against the top surface of the tape cassette 12. In addition, the driving gear 67 rotates counterclockwise, and the cam groove 67d is displaced so as to receive the projecting pin 74a of the pushing member 74 as the projecting pin 74a moves downwardly. The lock groove 67c is rotationally displaced in correspondence with the engaging pin 66f of the rotary arm 66.

As a result, the driving gear 67 rotates counterclockwise and the projecting pin 74a of the pushing member 74 enters into the entrance portion of the cam groove 67d as shown in FIG. 18. Since the pushing member 74 is pulled by the coil spring 84, the projecting pin 74a smoothly enters into the cam groove 67d in accordance with the rotation of the driving gear 67. The driving gear 67 drives the rotary arm 66, and the projecting pin 74a moves along the cam groove 67d and rotates the pushing member 74 clockwise. When the holder 55 reaches the predetermined loading position, the tape cassette 12 is firmly held in the loaded position without play by the pushing member 74. In addition, the lower edge of the lid 12b of the tape cassette 12 makes contact with the lid opening member 79 as the holder 55 is moved downwardly and the lid 12b is opened.

As shown in FIG. 17, the pin 64c2 makes contact with an end part of the vertical portion 59b2 of the guide groove 59b when the holder 55 reaches the predetermined loading position, and the the projection 66e of the rotary arm 66 makes contact with the contact piece 87a of the switch 87. As may be seen from FIGS.16(B) and 16(C), the supply of current to the drive motor 71 is stopped after a time t from a time when the contact piece 87a makes contact with the contact 87b and the switch 87 is closed, that is, the drive motor 71 is stopped after the time t from the time when the switch 87 is closed. The drive motor 71 does not stop immediately when the switch 87 closes, and continues to rotate for a short time period responsive to a signal from the control circuit described before.

When the holder 55 reaches the predetermined loading position as shown in FIG. 18, the gear 66b of the rotary arm 66 confronts the lage diameter gear 67b of the driving gear 67 and the rotary arm 66 stops rotating. When the rotary arm 66 stops, the switch 87 is already in the closed state, but the driving gear 67 further rotates counterclockwise because the drive motor 71 still rotates in the forward direction in this state. The engaging pin 66f of the stationary rotary arm 66 relatively enters into the lock groove 67d of the driving gear 67. Finally, the engaging pin 66f makes contact with the end part of the lock groove 67d and the driving gear 67 stops rotating. After the driving gear 67 stops, the pulley 69 slips on the belt 73 until the drive motor 71 stops. In other words, the drive motor 71 is not locked when the loading of the tape cassette 12 is completed, and the reliability of the drive motor 71 is high in that it is possible to prevent a large load that may damage the drive motor 71 from being applied on the drive motor 71.

When the engaging pin 66f of the rotary arm 66 enters into the lock groove 67c, an imaginary line connecting the center of the rotary arm 66 and the center of the engaging pin 66f becomes perpendicular to an imaginary line connecting the center of the driving gear 67 and the center of the engaging pin 66f. Hence, even when an external force acts on the holder 55 in the predetermined loading position and urges the holder 55 upwardly or downwardly, the rotary arm 66 is locked in a non-rotatable state and is prevented from rotating since the engaging pin 66f is engaged within the lock groove 67c as described before. In other words, because the rotary arm 66 is locked, the holder 55 in the predetermined loading position is prevented from moving even when the external force is applied thereon for some reason.

In addition, the driving gear 67 is also prevented from rotating counterclockwise by the engaging pin 66f of the rotary arm 66. Accordingly, the pushing member 74 is locked by the driving gear 67 in a state where the projecting pin 74a is engaged within the cam groove 67d. For this reason, the tape cassette 12 is stably held in the loaded position by the pushing force of the pushing member 74.

It requires a large pushing force to hold the tape cassette 12 in the loaded position. However, since the pushing member 74 is rotationally displaced by the cam groove 67d of the driving gear 67, the pushing member 74 is rotated mechanically and the tape cassette 12 can be held in the loaded position by the large pushing force of the pushing member 74. Moreover, because the tape cassette 12 is pushed and held in the loaded position by the pushing member 74 and the holder 55 is locked in the predetermined loading position by the driving gear 67, it is possible to effectively prevent an excessively large torque from being applied solely on the rotary arm 66. Consequently, the tape cassette 12 can be held in the loaded position with a sufficiently large pushing force and the holder 55 can be locked in the predetermined loading position without using a bulky motor for the drive motor 71.

Accompanied by the downward movement of the holder 55, the contact member 77 rotates counterclockwise due to its own weight and the contact portion 77a thereof is lowered. The portion 77b of the contact member 77 makes contact with the end part of the hole 59i and the contact member 77 stops. Thus, when the tape cassette 12 is loaded into the loaded position in the tape cassette loading and unloading apparatus 54, the contact member 77 is rotated to a rotary position where the contact portion 77a is at a lowered position, and the lid 75 is prevented from opening by the contact member 77. In other words, even when an attempt is made to open the lid 75 in the state where the tape cassette 12 is in the loaded position, the lid 75 can only rotate for an extremely small angle and makes contact with the contact portion 77a of the contact member 77 which prevents the lid 75 from being opened. In addition, when the contact member 77 makes contact with the lid 75, an imaginary line connecting the contact portion 77a and the pin 78 which supports the contact member 77 becomes perpendicular to the lid 75. Hence, even when an attempt is made to open the lid 75 from the outside with a large force, the contact member 77 will not rotate and the lid 75 is positively prevented from being opened.

Therefore, even when a child tries to put his hand into the tape cassette loading and unloading apparatus 54 through the inserting opening 13b in the state where the tape cassette 12 is in the loaded position, for example, the lid 75 will not rotate and it is possible to prevent the child from accidentally cutting his hand or the like.

Next, when an eject operation is carried out, the drive motor 71 rotates in the reverse direction as indicated by III in FIG. 16(C). Hence, the driving gear 67 is rotated clockwise and the lock groove 67c and the cam groove 67d are displaced accordingly. As the driving gear 67 rotates clockwise, the engaging pin 66f of the rotary arm 66 disengages and separates from the lock groove 67c, and the projecting pin 74a of the pushing member 74 moves in the direction Y2. Thus, the rotary arm 66 is released from the locked state and the pushing member 74 rotates counterclockwise. Consequently, the rotary arm 66 engaged to the pin 64c2 of the slide member 64 starts to rotate counterclockwise. When the rotary arm 66 rotates counterclockwise, the gear 66c of the rotary arm 66 meshes with the small diameter gear 67a of the driving gear 67 and the rotary arm 66 is driven thereby.

Furthermore, when the rotary arm 66 is rotationally driven counterclockwise, the projection 66e separates from the contact piece 87a. As shown in FIGS. 16(B) and 16(C), a high-level signal II from the resistor Rb is obtained via the terminal 87b1 of the switch 87 after the drive motor 71 starts to rotate in the reverse direction.

Accordingly, when the rotary arm 66 is rotated counterclockwise, the slide member 64 moves upwardly in the direction Y2 along the guide grooves 59a and 59b to the insertion completion position and thereafter moves horizontally in the direction X2. On the other hand, the holder 55 is moved upwardly from the predetermined loading position to the insertion completion position together with the slide member 64 accompanying the rotation of the levers 82a through 82d. In addition, the pushing member 74 rotates counterclockwise as the holder 55 moves upwardly because the cam groove 67d is rotationally displaced by the rotation of the driving gear 67. The projecting pin 66g makes contact with the lid opening lever 83, and the lid opening lever 83 is rotated clockwise by the counterclockwise rotation of the rotary arm 66.

As the lid opening lever 83 rotates clockwise, the lid opening lever 83 first makes contact with the portion 77b of the contact member 77 and rotates the contact member 77 and then opens the lid 75. For this reason, the contact member 77 rotates clockwise before the lid 75 opens, and the contact portion 77a is raised to the raised position where the contact portion 77a does not interfere with the opening of the lid 75.

Next, the lid opening lever 83 makes contact with a projecting pin 75c of the lid 75 and rotates the lid 75 counterclockwise against the force of the torsion spring 76. The lid 75 can open smoothly because the contact member 77 has rotated clockwise and the contact portion 77a is already in the raised position. Further, when the lid opening lever 83 rotates clockwise and opens the lid 75 to a fully opened state, the portion 77b of the contact member 77 enters a recess 83a of the lid opening lever 83. Accordingly, the lid 75 and the contact member 77 rotate to positions so as not to interfere with the ejection of the tape cassette 12 as the holder 55 is moved upwardly in the direction Y2 from the predetermined loading position. On the other hand, when the rotary arm 66 rotates counterclockwise, the pins 64c1 and 64c2 of the slide member 64 move horizontally along the guide grooves 59a and 59b. For this reason, the tape cassette 12 within the holder 55 is carried in the direction X2 together with the slide member 64 and is ejected through the inserting opening 13b.

When the tape cassette 12 is ejected to the cassette receiving position shown in FIG. 9, the pins 64c1 and 64c2 of the slide member 64 make contact with the end parts of the guide grooves 59a and 59b and the slide member 64 stops. In addition, the projection 66d of the rotary arm 66 makes contact with the contact piece 87a of the switch 87 when the slide member 64 stops. As may be seen from FIGS.16(A) and 16(C), the supply of the current to the drive motor 71 is continued for the time t after the tape cassette 12 is ejected and the contact piece 87a makes contact with the contact 87c, that is, for the time t after the switch 87 is closed. For this reason, the drive motor 71 continues to rotate in the reverse direction for the short time period responsive to a signal from the control circuit even after the switch 87 is closed so as to positively eject the tape cassette 12. After the pins 64c1 and 64c2 of the slide member 64 make contact with the end parts of the guide grooves 59a and 59b and the rotary arm 66 stops, the belt 73 slips until the drive motor 71 stops so as to reduce the load on the drive motor 71.

During the eject operation, the projecting pin 66g of the rotary arm 66 separates from the lid opening lever 83 as the tape cassette 12 is ejected in the direction X2. Hence, the lid opening lever 83 rotates counterclockwise due to its own weight and separates from the projecting pin 75c of the lid 75. After the ejected tape cassette 12 is extracted from the inserting opening 13b, the lid 75 is closed by the action of the torsion spring 76.

Further, the present invention is not limited to these embodiments, but various variations and modifications may be made without departing from the scope of the present invention.

What is claimed is:

1. A tape cassette loading and unloading apparatus comprising:
   a frame;
   a holder provided within said frame for receiving and moving a tape cassette which is inserted into said holder;
   holder guide means for guiding said holder horizontally between a cassette receiving position where the tape cassette is received and an insertion completion position and for guiding said holder vertically between said insertion completion position and a predetermined loading position;
   holder moving means for moving said holder between said cassette receiving position and said predetermined loading position via said insertion completion position;
   a motor which rotates in a first direction during a tape cassette loading mode and rotates in a second direction during a tape cassette unloading mode, said second direction being opposite to said first direction;
   transmitting means coupled to said motor for transmitting a rotational driving force of said motor to said holder moving means so that said holder is moved to said predetermined loading position via said insertion completion position during the tape cassette loading mode and said holder is moved to said cassette receiving position via said insertion completion position during the tape cassette unloading mode, said transmitting means comprising first and second rotary members which are rotatably supported on said frame, said first rotary member being coupled to said motor and to said second rotary member and being driven by said motor to rotate said second rotary member, said second rotary member being coupled to said holder moving means and rotating to drive said holder moving means,
   said first rotary member locking said second rotary member when said holder reaches said predetermined loading position in the tape cassette loading mode, so that said holder is immovably locked in said predetermined loading position; and
   a pushing member for pushing a top surface of said tape cassette as said holder moves from said insertion completion position to said predetermined loading position so as to hold said tape cassette in a loaded position when said holder is in said predetermined loading position,
   said first rotary member comprising a first gear rotatably supported on said frame and driven by said motor, said second rotary member comprising a second gear rotatably supported on said frame for driving said holder, said second gear having an untoothed part, said first gear meshing with said second gear so as to transmit the rotational driving force of said motor to said holder moving means and moving said pushing member as said holder moves from said insertion completion posiltion to said predetermined loading position, said second gear stopping at a rotary position where said untoothed part confronts said first gear when said holder reaches said predetermined loading position and said first gear locking said second gear by rotating after said second gear stops.

2. A tape cassette loading and unloading apparatus as claimed in claim 1 in which said first gear is driven by said motor via at least a belt.

3. A tape cassette loading and unloading apparatus as claimed in claim 2 in which said transmitting means further comprises a first pulley fixed to a rotary shaft of said motor and a second pulley rotatably supported on said frame, said belt being provided between said first and second pulleys to drive said second pulley, said first gear being driven by said second pulley.

4. A tape cassette loading and unloading apparatus as claimed in claim 2 in which said first gear comprises a large diameter gear which is driven by said motor via at least said belt, and a small diameter gear which meshes with said second gear.

5. A tape cassette loading and unloading apparatus as claimed in claim 1 in which said first gear comprises an engaging groove and said second gear comprises an engaging pin, said engaging groove of said first gear engaging said engaging pin to lock said second gear when said holder reaches said predetermined loading position.

6. A tape cassette loading and unloading apparatus as claimed in claim 1 in which said first gear comprises a groove which engages said pushing member when said holder moves from said insertion completion position to said predetermined loading position.

7. A tape cassette loading and unloading apparatus as claimed in claim 1 which further comprises a switch for controlling a rotational state of said motor, said second gear comprising a first projection for activating said switch when said tape cassette is inserted into said holder which moves from said cassette receiving position to said predetermined loading position in the tape cassette loading mode and a second projection for activating said switch when said holder which accommdates said tape cassette moves from said predetermined loading position to said cassette receiving position in the tape cassette unloading mode.

8. A tape cassette loading and unloading apparatus as claimed in claim 7 in which said switch stops said motor after a predetermined time from a time when said switch is activated.

9. A tape cassette, loading and unloading apparatus as claimed in claim 1 which further comprises an inserting opening through which said tape cassette is inserted into said holder in said cassette receiving position and a normally closed lid provided at said inserting opening, said second gear opening said lid when said holder moves toward said insertion completion position from said predetermined loading position in the tape cassette unloading mode.

* * * * *